Oct. 20, 1970  R. A. WOLSCHRIJN  3,535,524
MEASUREMENT OF ALPHA CONTAMINATION ON SURFACE
OF FISSILE ELEMENT
Filed Sept. 15, 1967  2 Sheets-Sheet 1

INVENTOR
ROLF ARTHUR WOLSCHRIJN

By Cushman, Darby & Cushman
ATTORNEYS

United States Patent Office 3,535,524
Patented Oct. 20, 1970

3,535,524
MEASUREMENT OF ALPHA CONTAMINATION ON SURFACE OF FISSILE ELEMENT
Rolf A. Wolschrijn, Bergen, Netherlands, assignor to Reactor Centrum Nederland, The Hague, Netherlands, an Institute of the Netherlands
Filed Sept. 15, 1967, Ser. No. 667,938
Int. Cl. G01t 1/18
U.S. Cl. 250—83.6                         8 Claims

ABSTRACT OF THE DISCLOSURE

A device for measuring surface contamination by α-radiators on fissile rods consists of an ionization chamber which is equipped for carrying out measurements at a low voltage. In the ionization chamber the rods can be fastened and serve as one of two electrodes, the other electrode forming the wall of the ionization chamber.

---

The invention relates to a device for measuring surface contamination of one or more fissile elements or nuclear reactor fuel rods, hereinafter briefly termed fissile rods, by means of α-radiators, comprising a pulse ionization chamber provided with means for admitting an ionizable gas and with a fastening for one or more fissile rods.

It has been found possible for the purpose of contamination measurements to apply the principle of proportional counting with gas amplification.

In order to obtain gas amplification a high electric potential is required and it is also necessary to use electrodes having the form of thin wires. The use of thin wires is necessary to enable a steep gradient to be obtained in an electric field around these wires, which may give rise to secondary ionizations.

The known solution of this problem therefore shows several drawbacks. The thin wires are highly vulnerable, especially during assembly. In the first place the vulnerability of the pulse ionization chamber is a drawback. Moreover, apparatus equipment is required for generating the high potential. The known forms of apparatus are, moreover, complicated on account of the fact that they call for a bulky, intricate system of thin electrodes the finishing of which is difficult, and owing to the high potential used special measures have to be taken to ensure sufficient electrical insulation.

For operating the known measuring device with its bulky electrode system a vacuum pump system is necessary because of the unwieldy size. It is extremely difficult, if not impossible, to fill a large ionization chamber with an ionizable gas directly from a compressed gas cylinder without the aid of vacuum suction, without any air impurities being left behind.

The invention aims at preventing the aforementioned drawbacks by carrying out the measurement at a low voltage, so that the ionization chamber is adapted for low voltages and the fissile rod itself is used as electrode. By low voltage is meant that the strength of the electric field is too low for secondary ionization.

The use of a low-voltage measuring system not only renders it unnecessary to provide a connection for high voltage, but it is also found that in this way the electrode system can be greatly simplified. Fairly thick electrodes may be used, such as the fissile rod.

By using the fissile rod as electrode, the transverse dimension of the ionization chamber is reduced to such an extent as compared with the known device that no vacuum pump system is needed.

It is now merely necessary to scavenge the ionization chamber by the use of argon or other gases or mixtures thereof, e.g. from a compressed gas cylinder.

According to a preferred embodiment the external electrode is constructed in the form of a single coherent metal wall surface which during measurement surrounds the fissile rod at a certain distance from it and forms the wall of the ionization chamber.

Because o fthe low voltage used, it is not necessary to surround the electrode system by a special insulating sleeve in order to protect the operating staff from electric shocks in the event of their touching the wall of the ionization chamber.

In this embodiment the ionization chamber has compartively small transverse dimensions and can therefore more easily be filled with an ionizable gas.

The use of an ionization chamber with small transverse dimensions renders it very easy to mount this chamber either horizontally or vertically. In the case of an ionization chamber of large dimensions, possibly with a bulky electrode system, this is not possible; such a chamber can as a rule only be used vertically. A small ionization chamber can easily be shifted in position.

Furthermore, a very convenient form of contamination meter can be obtained by providing the fissile rod prior to testing with two closure caps of insulating material, at least one of which fits entirely into a tube serving as the ionization chamber. The closure caps also serve for centering the fissile rod with respect to the tube.

The closure caps are positioned at either end of the fissile rod. If one or both of the closure caps fit into the tube, one can work very quickly by sliding the fissile rod with both its closure caps into the tube. By insulating material is meant a material such as Teflon or nylon.

An advantageous form of construction for the closure caps is that one or both of them have a metal hood with recesses for bayonet closures which fit on to one or more projecting parts on the tube serving as the ionization chamber. By the use of bayonet closures the ionization chamber can be closed in an easy manner by slight rotational movements.

According to a further improvement one or both of the closure caps are provided with clamping springs in a cavity into which the fissile rod fits, which is effected in such a way that one clamping spring forms an electrical contact with the fissile bar to be measured. By using a clamping spring as an electrical contact one can be certain that a conductive electrical connection is actually establisred.

For the measurement of surface contamination one or more blank measurements are carried out in the ionization chamber with uncontaminated fissile rods or test objects and the result subtracted from measurements with contaminated objects.

It has been ascertained that the counting rate of background radiations measured in this way is approximately four per minute. The counting rate of background radiations and sample was found to be within normal statistical limits.

A method that has proved servicable in practice for checking the constancy of background radiation consists in using a two-channel or multi-channel pulse analyzer for measuring ionization pulses in the ionization chamber.

After the impulses caused by α-radiation have been amplified they are led to a two-channel or multi-channel pulse analyzer. In the case of measurements with a multichannel analyser it has been found that as a result of α-radiation the pulses are to a large extent above a certain threshold value, while the weaker pulses which may be produced, for instance, to electronic noise, are practically all below this value.

If in case of irregularities in the amplifier apparatus there is too great a noise, some of pulses might extend above the threshold and on that account be erroneously included among impulses caused by α-radiation.

As this phenomenon is always accompanied by an increase of the number of pulses below the threshold value, it has been found expedient to gather the pulses below this threshold value into a checking channel.

If the number of pulses gathered into this channel in a given count is normal, there will not be any irregularity due to noise in the counting channel.

Two-channel or multichannel pulse analysers nowadays form part of the normal equipment of nuclear or other laboratories. Measurements of the contamination of fissile rods can according to the invention be carried out with ionization chambers that are very easy to manufacture, it being possible to add these ionization chambers to existing equipment. It may now be possible to use existing equipment in a more efficient manner also for contamination measurements, at any rate if it is not necessary to measure the contamination of fissile rods during a very long period.

If there is not a two-channel or multichannel pulse analyser available, it is also possible to use a single-channel pulse analyser without a check channel but having a threshold discriminator. By a threshold discriminator is meant here a system of connection in which only pulses with a higher energy than a certain threshold value are admitted into the measuring channel.

A suitable method for the measurement of contamination is that the fissible rods concerned are tested in succession in a series in which check objects are also included.

A device for the successive testing of large numbers of fissile rods consists of an ionization chamber provided with means for the automatic feed and removal of the fissile rods and check objects to be tested and with means for the separate removal of fissile rods that are too badly contaminated.

The invention will be further understood from the following more detailed description of an illustrative embodiment taken with the drawings in which.

Figure 1:
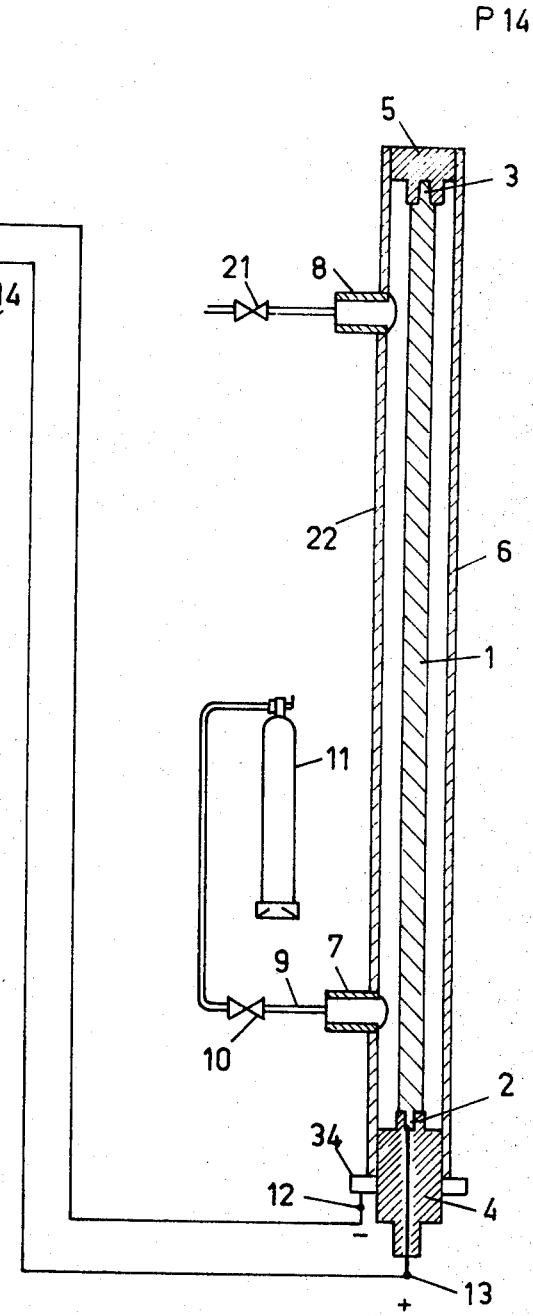
FIG. 1 is a schematic sectional view of a contamination meter with a system of connection for recording apparatus.
Figure 1:
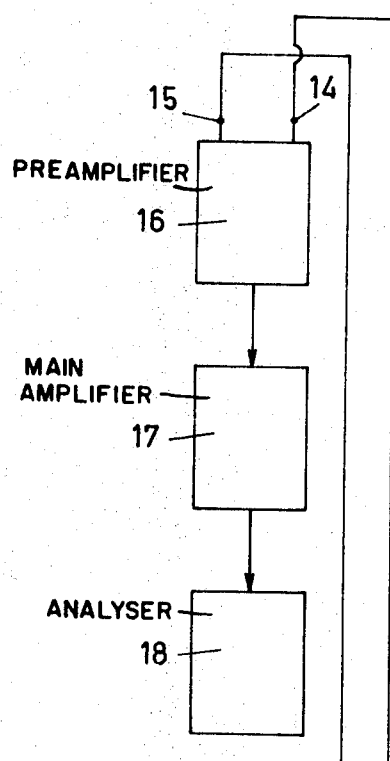

Reference numeral 22 in FIG. 1 represents an ionization chamber in which a fissile rod 1 is mounted by being fixed at its ends 2 and 3 in closure caps 4 and 5. The closure caps 4 and 5 are of insulating material; a very suitable material for this is Teflon or nylon.

Closure caps 4 and 5 close a tube 6 which serves as outer jacket of the ionization chamber 22. Tube 6 may for instance be of stainless steel, whilst the fissible rod 1 may for instance be $UO_2$, which is provided with a covering of zirconium alloy. Tube 6 is provided with connections 7 and 8 for the admission and discharge of gas, connection 7 having an inlet duct 9 with a reduction valve 10, which duct is connected with a compressed gas cylinder 11. The compressed gas cylinder 11 may contain, for instance, argon.

Connection 8 is provided with a controllable value 21 which can be adjusted to a slight overpressure. The ionization chamber 22 is operated at a pressure ranging between 0.1 and 1 atmosphere overpressure, thus preventing extraneous gas from leaking into it. It has been found that at this gas pressure the ionization chamber gives optimum measuring results. The fissible rod 1 and the tube 6 are provided with terminals 12 and 13 for an electric potential. Terminal 12 is in this case positioned on a metal hood 34 which is fixed to the closure cap 4, which metal hood is in electrical contact, by means of a bayonet closure on tube 6, with its wall. The fissile rod 1 is used as a positive electrode, and the difference of potential between fissile rod 1 and tube 6 has a value between 50 and 200 v.

Terminals 12 and 13 are connected by electric leads with terminals 14 and 15 of a load-sensitive preamplifier 16. As a rule a coaxial cable is used for the electrical leads between the terminals 12 and 13 and terminals 14 and 15. The load-sensitive preamplifier 16 is connected with a main amplifier 17 which in turn is connected with an analyser 18. The analyser 18 may be a two-channel or multichannel pulse amplifier. It is also possible to use a single-channel analyser only, which in that case is provided with a threshold discriminator.

If contamination of a fissile rod is to be measured the fissile rod is first fitted with closure caps 4 and 5, after which it is fixed in the ionization chamber by being slid upwards from below in tube 6.

Figure 2:
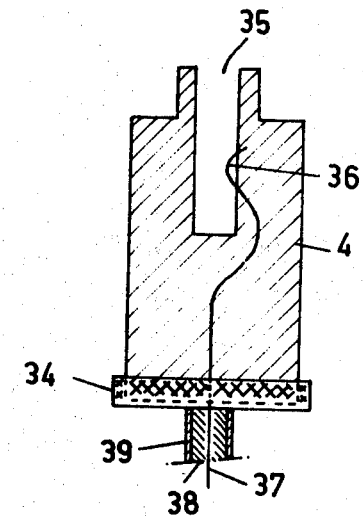
FIG. 2 is a fragmentary view, on an enlarged scale, of part of the meter of FIG. 1.

In FIG. 2, the end 2 of the fissile rod 1 in FIG. 1 can fit into a cavity 35, of the closure cap 4. Inside cavity 35 there is a clamping spring 36 which is connected with a central cable 37 of a coaxial cable 38. The metal hood 34 already mentioned is connected with an enveloping cable 39 of the coaxial cable 38.

Figure 3:
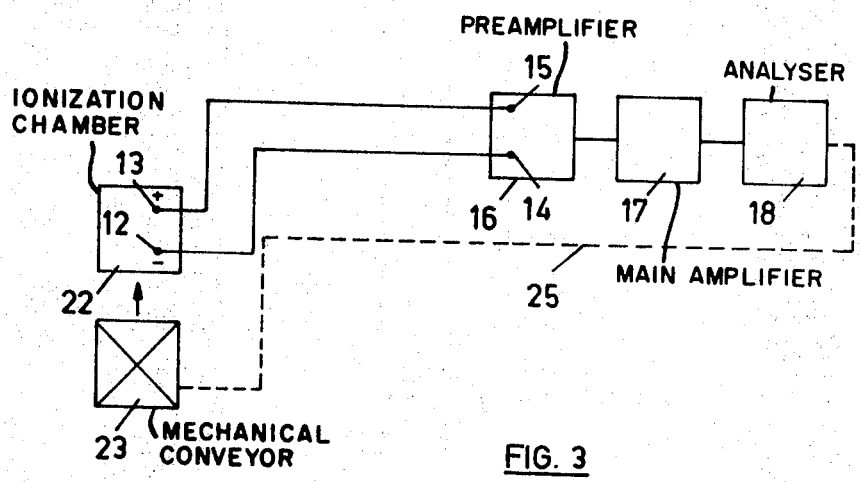
FIG. 3 is a diagrammatic representation of apparatus for the continuous testing of large numbers of fissile rods.

Item 23 in FIG. 3 represents a mechanical conveyor by means of which fissile rods can be conveyed into and out of the ionization chamber 22. Conveyor 23 is connected by an electro-mechanical coupling 25 with analyser 18, so that fissile rods which are too badly contaminated can be separated.

While a preferred embodiment of the present invention has been described, modifications may be made without departing from the scope of the invention. Therefore, it is to be understood that the details set forth or shown in the drawing are to be interpreted as illustrative, except as they appear in the appended claims.

What is claimed is:

1. A device for measuring surface contamination by α-radiators of a fissile element comprising wall means surrounding said fissile element in electrically insulated spaced relationship thereto and defining a chamber, means for admitting an ionizable gas into said chamber; means for establishing a low electrical potential between said fissile element and said wall means, said potential being too low for secondary ionization whereby said chamber functions as an ordinary ionization chamber, which measures the primary ionization current caused by the α-particles, whereby said fissile element and said wall means function as electrodes for said ionization chamber and current pulse measuring means electrically connected to said element and to said wall means for measuring pulses of current between said element and said wall means, discriminating the pulses in such a way, that only those caused by α-particles are registered.

2. A device as in claim 1 wherein said wall means includes a tube surrounding said fissile element and at least one insulating closure cap fitted inside one end of said tube and supporting said fissile element within said tube.

3. A device as in claim 2 including a bayonet connector connecting said one end of said tube with said closure cap, said connector including at least one projection on said one end of said tube and a metal hood provided on said closure cap, said hood having a recess co-operating wtih said projection.

4. A device as in claim 3 wherein said closure cap is provided with a cavity into which said one end of said fissile element is fitted, said cap including a clamping spring projecting into said cavity and forming an electrical contact with the fissile element.

5. A device as in claim 4 wherein the other end of said tube is provided with a substantially identical closure cap.

6. A method of measuring surface contamination by α-radiators of an elongated fissile element comprising: fixing supporting caps to the ends of said element, sliding the resulting assembly into a tube, closing the ends of said tube wtih said caps, scavenging air from the chamber bounded by said element, said caps and said tube by passing ionizable gas through said chamber, sealing said chamber, establishing an electrical potential between said element and said tube, said potential being too low for secondary ionization to occur, and measuring the pulses of current which pass between said element and said tube.

7. A method as in claim 6 including making similar pulse measurements with uncontaminated check elements and subtracting the latter measurements from the measurements made with contaminated elements.

8. A method as in claim 7 wherein pulse measurements are made on a series of different contaminated elements which series includes uncontaminated check elements.

References Cited

UNITED STATES PATENTS 2,340,967   2/1944   Langer _____ 250—83.6
2,957,084   10/1960   Marr et al.

FOREIGN PATENTS 818,685   8/1959   Great Britain.

ARCHIE R. BORCHELT, Primary Examiner